(12) United States Patent
Reinhardt et al.

(10) Patent No.: US 10,882,364 B2
(45) Date of Patent: Jan. 5, 2021

(54) TIRE WITH CONCAVE SIDEWALLS

(71) Applicant: Bridgestone Americas Tire Operations, LLC, Nashville, TN (US)

(72) Inventors: Sharon E. Reinhardt, Fairlawn, OH (US); William H. Durivage, Akron, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 404 days.

(21) Appl. No.: 15/541,050

(22) PCT Filed: Oct. 22, 2015

(86) PCT No.: PCT/US2015/056897
§ 371 (c)(1),
(2) Date: Jun. 30, 2017

(87) PCT Pub. No.: WO2016/109006
PCT Pub. Date: Jul. 7, 2016

(65) Prior Publication Data
US 2017/0355233 A1 Dec. 14, 2017

Related U.S. Application Data

(60) Provisional application No. 62/097,831, filed on Dec. 30, 2014.

(51) Int. Cl.
*B60C 17/08* (2006.01)
*B60C 13/00* (2006.01)
(Continued)

(52) U.S. Cl.
CPC ............... *B60C 17/08* (2013.01); *B60C 3/04* (2013.01); *B60C 7/22* (2013.01); *B60C 7/24* (2013.01);
(Continued)

(58) Field of Classification Search
CPC .. B60B 21/00; B60C 9/20; B60C 9/18; B60C 9/02; B60C 3/00; B60C 5/00; B60C 3/04;
(Continued)

(56) References Cited

U.S. PATENT DOCUMENTS 3,805,868 A * 4/1974 Tangorra ................ B60C 3/00
152/454
3,850,218 A 11/1974 Bertelli
(Continued)

FOREIGN PATENT DOCUMENTS

DE 3640222 6/1987
EP 0346047 A2 * 12/1989 ............... B60C 3/04
(Continued)

OTHER PUBLICATIONS

Search Report and Written Opinion; Corresponding European Application No. 15875869.8; Carneiro, Joaquim; dated Jul. 6, 2018.
(Continued)

*Primary Examiner* — Matthew J Daniels
*Assistant Examiner* — Shibin Liang
(74) *Attorney, Agent, or Firm* — Shaun J. Fox; Bryan J. Jaketic

(57) ABSTRACT

A tire having a central axis and a radius further includes a circumferential tread having a convex cross-section. The convex cross-section is defined by a radius that is less than a maximum radius of the tire. A pair of sidewalls extends from opposite sides of the circumferential tread. Each of the pair of sidewalls has a concave cross-section that is defined by a radius that is greater than a maximum radius of the convex cross-section of the circumferential tread.

19 Claims, 5 Drawing Sheets

(51) Int. Cl.
  *B60C 11/00* (2006.01)
  *B60C 7/22* (2006.01)
  *B60C 3/04* (2006.01)
  *B60C 7/24* (2006.01)
  *B60C 9/18* (2006.01)
  *B60C 7/00* (2006.01)

(52) U.S. Cl.
  CPC ............ *B60C 9/18* (2013.01); *B60C 11/0083* (2013.01); *B60C 13/003* (2013.01); *B60C 13/004* (2013.01); *B60C 2007/005* (2013.01); *B60C 2200/10* (2013.01)

(58) Field of Classification Search
  CPC ..... B60C 15/024; B60C 17/08; B60C 13/003; B60C 5/14; B60C 17/00; B60C 15/00; B60C 11/01
  See application file for complete search history.

(56) References Cited

U.S. PATENT DOCUMENTS

| | | | |
|---|---|---|---|
| 4,986,326 A | 1/1991 | Watkins | |
| 5,482,102 A | 1/1996 | Suzuki | |
| 6,257,290 B1 | 7/2001 | Sakamoto | |
| 6,405,773 B1 | 6/2002 | Vossberg et al. | |
| 6,418,993 B1 | 7/2002 | Sakamoto | |
| 6,530,404 B1 | 3/2003 | Rooney | |
| 6,609,551 B2 | 8/2003 | Clauzade | |
| 6,866,734 B1 | 3/2005 | Ridha | |
| 7,546,862 B2 | 6/2009 | Moon | |
| 7,886,790 B2 | 2/2011 | Yokokura | |
| 7,900,671 B2 | 3/2011 | Miyazaki | |
| 7,926,532 B2 * | 4/2011 | Prost | B60C 3/06 152/526 |
| 8,602,074 B2 | 12/2013 | Matsunaga | |
| 2002/0100531 A1 | 8/2002 | Clauzade | |
| 2002/0124929 A1 * | 9/2002 | Rhyne | B60C 9/18 152/544 |
| 2002/0195184 A1 | 12/2002 | Armellin et al. | |
| 2005/0072507 A1 * | 4/2005 | Chrobak | B29D 30/00 152/452 |
| 2006/0162836 A1 | 7/2006 | Maehara | |
| 2012/0067476 A1 | 3/2012 | Imhoff et al. | |
| 2012/0073719 A1 | 3/2012 | Kurosawa | |
| 2014/0144565 A1 | 5/2014 | Yukawa | |

FOREIGN PATENT DOCUMENTS

| | | |
|---|---|---|
| EP | 1361078 | 11/2003 |
| EP | 2196328 | 6/2010 |
| JP | S5953204 | 3/1984 |
| JP | 2014-213619 | 11/2014 |

OTHER PUBLICATIONS

International Search Report and Written Opinion; Corresponding PCT Application No. PCT/US2015/056897; Commissioner; Korean Intellectual Property Office, Seo-gu, Daejeon, Republic of Korea; dated Jan. 27, 2016.

* cited by examiner

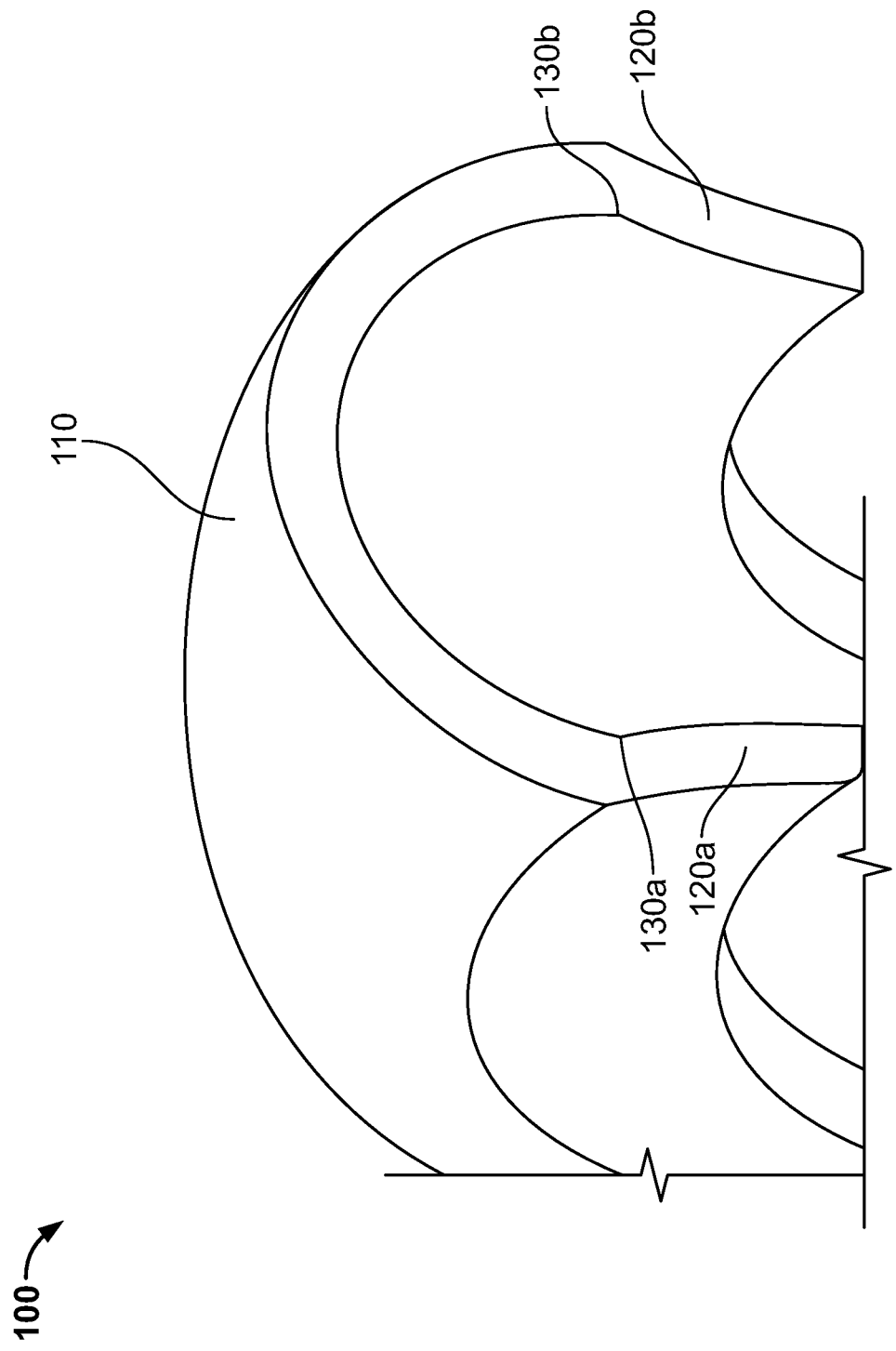

US 10,882,364 B2

TIRE WITH CONCAVE SIDEWALLS

FIELD OF INVENTION

The present disclosure relates to a tire having concave sidewalls. More particularly, the present disclosure relates to a pneumatic or non-pneumatic having concave sidewalls and a convex tread.

BACKGROUND

Pneumatic tires run in an inflated condition. Various tire constructions have been developed which enable a tire to run in an uninflated or underinflated condition. "Run flat tires" may continue to operate after being punctured and experiencing a complete or partial loss of pressurized air for extended periods of time and at relatively high speeds. One such type of run flat tire incorporates a shear element that acts as a tension member when the tire is pressurized and acts as a structural compression member when the tire is in an unpressurized or partially pressurized state.

Non-pneumatic tires do not require inflation and may be particularly useful in off-road applications and in locations where it would be difficult to repair or replace a tire. Some known non-pneumatic tires include a plurality of spokes extending between a first hoop and a second hoop.

SUMMARY

In one embodiment, a tire includes a convex circumferential tread. The tire also includes a first concave sidewall extending from the convex circumferential tread at a first hinge and a second concave sidewall extending from the convex circumferential tread at a second hinge opposite the first hinge. A line tangent to an interior surface of the convex circumferential tread at the first hinge, and a line tangent to an interior surface of the first concave sidewall at the first hinge form a first interior angle greater than 90-degrees when the tire is not placed under radial compression. A line tangent to the interior surface of the convex circumferential tread at the second hinge, and a line tangent to an interior surface of the second concave sidewall at the second hinge form a second interior angle greater than 90-degrees when the tire is not placed under radial compression.

In another embodiment, a tire having a central axis and a radius further includes a circumferential tread having a convex cross-section. The convex cross-section is defined by a radius that is less than a maximum radius of the tire. A pair of sidewalls extend from opposite sides of the circumferential tread. Each of the pair of sidewalls has a concave cross-section that is defined by a radius that is greater than a maximum radius of the convex cross-section of the circumferential tread.

In yet another embodiment, a tire and rim assembly includes a rim having a pair of wheel flanges, including a first wheel flange and a second wheel flange. The assembly further includes a tire mounted on the rim. The tire includes a tread formed in a crown region of the tire, the tread having a convex cross-section. The tire also includes a first sidewall extending from a first side of the crown region. The first sidewall has a concave cross-section. The first sidewall of the tire is received by the first wheel flange of the rim, and exerts a first axially outward force against the first wheel flange of the rim. The assembly also includes a second sidewall extending from the crown region opposite the first sidewall. The second sidewall has a concave cross-section. The second sidewall is received by the second wheel flange of the rim, and exerts a second axially outward force against the second wheel flange of the rim.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

FIG. 1 illustrates a perspective view of one embodiment of a tire having concave sidewalls.

DETAILED DESCRIPTION

Figure 2A:
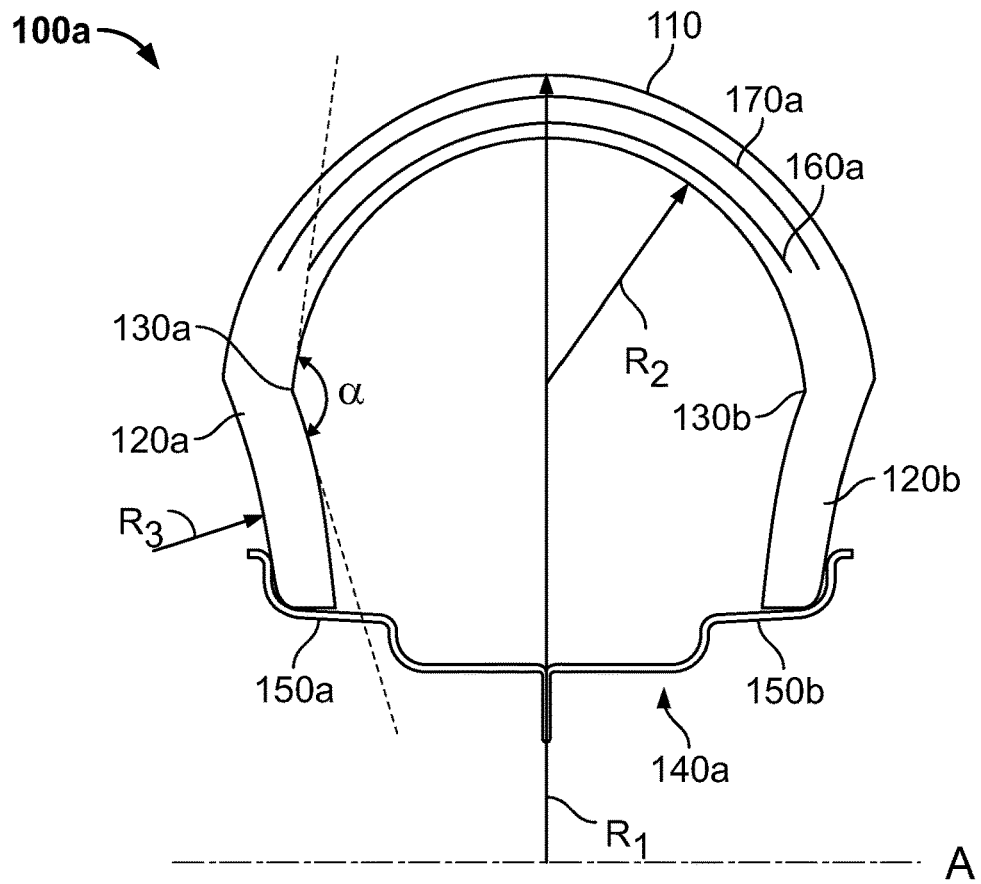
FIGS. 2-8 are schematic drawings illustrating a cross-section of various embodiment of a tire having concave sidewalls.

The following includes definitions of selected terms employed herein. The definitions include various examples or forms of components that fall within the scope of a term and that may be used for implementation. The examples are not intended to be limiting. Both singular and plural forms of terms may be within the definitions.

"Axial" or "axially" refer to a direction that is parallel to the axis of rotation of a tire.

"Circumferential" and "circumferentially" refer to a direction extending along the perimeter of the surface of the tread perpendicular to the axial direction.

"Equatorial plane" refers to the plane that is perpendicular to the tire's axis of rotation and passes through the center of the tire's tread.

"Radial" and "radially" refer to a direction perpendicular to the axis of rotation of a tire.

"Tread" refers to that portion of the tire that comes into contact with the road under normal load.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

The terms "concave" and "convex" are used from a perspective exterior to a tire surface.

FIG. 1 illustrates a perspective view of one embodiment of a tire 100 in an unloaded condition. The tire 100 includes a convex circumferential tread 110 in a crown region of the tire. In one embodiment, a center region of the convex circumferential tread 110 is stiffer than outer regions of the convex circumferential tread. In an alternative embodiment, the convex circumferential tread 110 has a substantially uniform stiffness.

The tire 100 also includes a first concave sidewall 120a extending from the convex circumferential tread 110 at a first hinge 130a and a second concave sidewall 120b extending from the convex circumferential tread 110 at a second hinge 130b opposite the first hinge 130a.

FIG. 2A is a schematic drawing illustrating a cross-section of one particular embodiment of the tire 100a. In this embodiment, the tire 100a is a pneumatic tire having a circumferential belt 160a and a cap ply 170a. The tread 110 and sidewalls 120a,b are each constructed of rubber or another elastomeric material.

The tire 100a is mounted on a rim 140a having a pair of wheel flanges, including a first wheel flange 150a and a second wheel flange 150b. The first sidewall 120a is received by the first wheel flange 150a and exerts a first axially outward force against the first wheel flange 150a. The second sidewall 120b is received by the second wheel flange 150b, and exerts a second axially outward force against the second wheel flange 150b. In one embodiment, the first and second axially outward forces are each between 100 and 500 pounds. In an alternative embodiment, the first and second axially outward forces are each between 10 and 2000 pounds. In an alternative embodiment, the sidewalls do not exert axially outward forces against the wheel flanges. In such an embodiment, the tire may be clamped to the rim.

When the tire 100a receives a load, such as a vertical load from a vehicle and its cargo, the convex circumferential tread 110 absorbs the load at a footprint of the tire (i.e., the portion of the tire 100a in contact with a road or other rolling surface). If the load is above a minimum threshold, the convex circumferential tread 110a deflects, or flattens, pushing the sides of the tread outward. The concave sidewalls 120a,b likewise deflect outwards to carry a portion (or even a majority) of the load while minimizing footprint buckling. This outward deflection of the top part of the concave sidewall puts the convex tread portion in tension, which reduces or minimizes footprint buckling.

The circumferential belt 160a is disposed radially above a body ply (not shown) and extends axially across a portion of the crown region. The circumferential belt 160a may contain steel cords or other reinforcing cords. In an alternative embodiment, the circumferential belt lacks metal. While the illustrated embodiment shows a single circumferential belt, in an alternative embodiment, two or more belts are employed.

The cap ply (or reinforcing ply) 170a is disposed above the circumferential belt 160a. The belt 160a and cap ply 170a have substantially the same curves, such that the spacing between the belt 160a and cap ply 170a is the same across the crown region. The reinforcing ply 170a may be constructed of nylon or another polymeric material. While the illustrated embodiment shows a single cap ply, in an alternative embodiment, two or more cap plies are employed.

As can be seen from this view, the tread 110 is highly convex. More specifically, while the tire 100a has a maximum tire radius $R_1$ (i.e., the distance between an axis A of the tire 100a and an apex of the convex tread 110), the convex shape of the tread 110 is defined by a tread radius $R_2$ that is less than the maximum tire radius $R_1$. In the illustrated embodiment, the convex shape of the circumferential tread 110 is an arc defined by a single radius $R_2$. In an alternative embodiment (not shown), the convex shape of the circumferential tread is a curve defined by multiple radii.

The sidewalls 120a,b are not highly concave. More specifically, the concave shape of each sidewall 120a,b is defined by a sidewall radius $R_3$ that is greater than the tread radius $R_2$. In one specific embodiment, the sidewall radius $R_3$ is greater than the maximum tire radius $R_1$. In the illustrated embodiment, the concave shape of each sidewall 120a,b is an arc defined by a single radius $R_3$. In an alternative embodiment (not shown), the concave shape of each sidewall is a curve defined by multiple radii.

As can also be seen in FIG. 2A, a line tangent to an interior surface of the convex circumferential tread 110 at the first hinge 130a, and a line tangent to an interior surface of the first concave sidewall 120a at the first hinge 130a form a first interior angle α. Because the convex circumferential tread 110 is highly convex, the first interior angle α is obtuse (i.e. greater than 90-degrees) when the tire 100a is not carrying a load, or otherwise placed under radial compression. Likewise, a second interior angle formed by a line tangent to an interior surface of the convex circumferential tread 110 at the second hinge 130b, and a line tangent to an interior surface of the second concave sidewall 120b is also obtuse. In one embodiment, the interior angles remain obtuse when the tire is in a loaded condition (i.e., when the tire is under radial compression). However, in some embodiments, the interior angles may become acute under certain loading conditions.

Figure 2B:
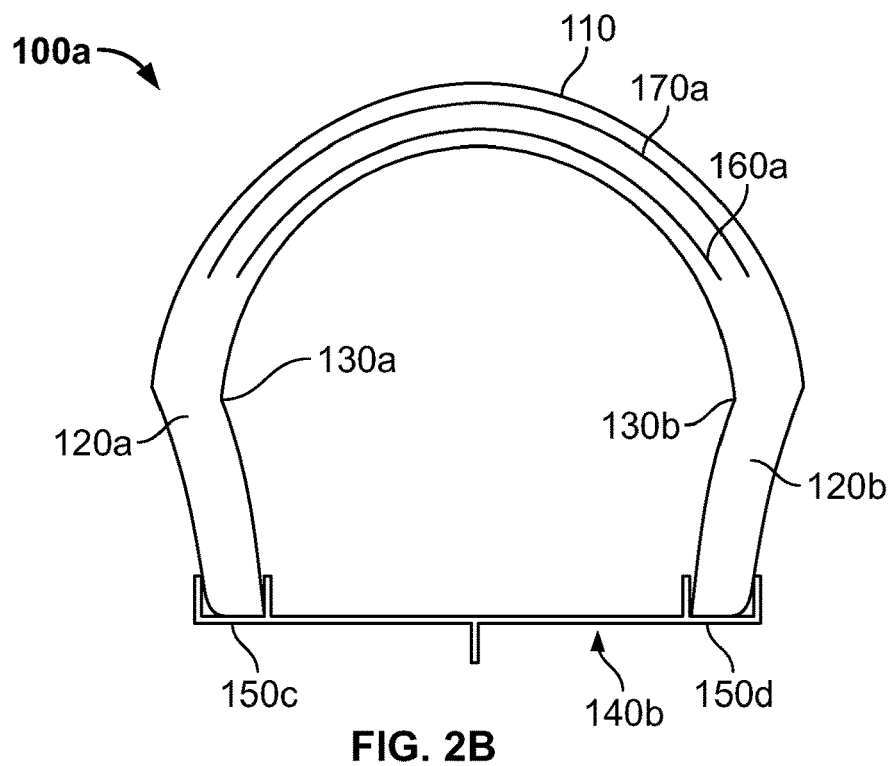

FIG. 2B is a schematic drawing illustrating a cross-section of the same tire 100a of FIG. 2A mounted on a different rim 140b. The rim 140b does not include flanges, but instead the first sidewall 120a is received in a first clamp 150c and the second sidewall 120b is received in a second claim clamp 150d. The clamps 150c,d hold the sidewalls 120a,b in place by friction. Alternatively, bolts or other fasteners may be employed to affix the sidewalls 120a,b in the clamps 150c,d.

Figure 3:
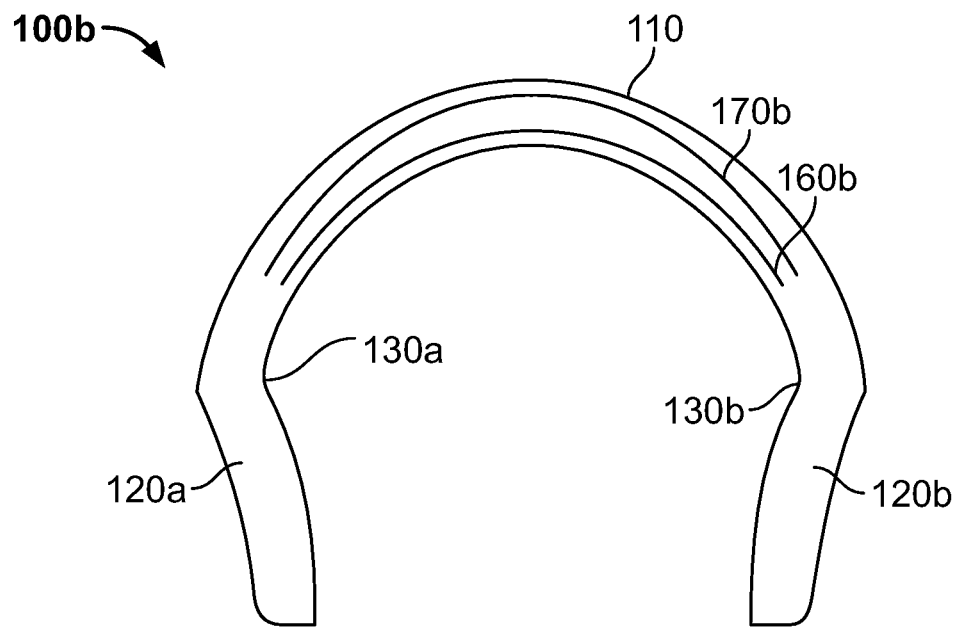

FIG. 3 is a schematic drawing illustrating a cross-section of an alternative embodiment of a tire 100b. In this embodiment, the tire 100b is substantially similar to the tire 100a described above in reference to FIG. 2, except for the differences discussed herein. Like numbers are used for like elements. The same materials may be used as those described in FIG. 2. Additionally, the alternative embodiments discussed with respect to FIG. 2 may also be applicable.

The tire 100b includes a belt 160b and a cap ply 170b. The cap ply 170b is more convex than the belt 160b. As a result, the ends of the cap ply 170b are spaced closer to the belt 160b than a central portion of the cap ply 170b.

Figure 4:
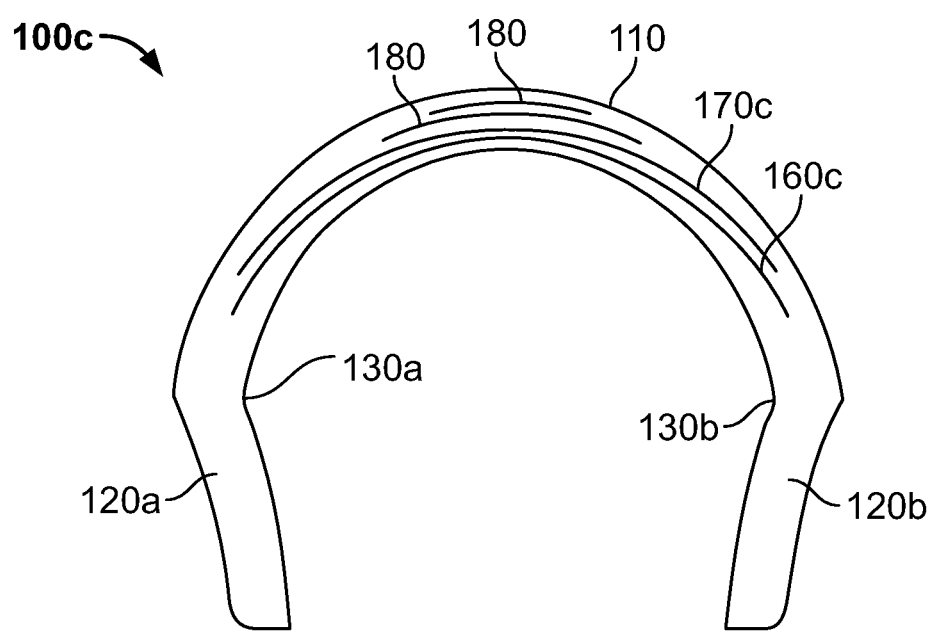

FIG. 4 is a schematic drawing illustrating a cross-section of an alternative embodiment of a tire 100c. In this embodiment, the tire 100c is substantially similar to the tires 100a and 100b described above in reference to FIGS. 2 and 3, except for the differences discussed herein. Like numbers are used for like elements. The same materials may be used as those described in FIG. 2. Additionally, the alternative embodiments discussed with respect to FIG. 2 may also be applicable.

The tire 100c includes a belt 160c and a cap ply 170c. In the illustrated embodiment, the belt 160c and cap ply 170c have substantially the same curves, such that the spacing between the belt 160c and cap ply 170c is the same across the crown region. In an alternative embodiment (not shown), the cap ply is more convex than the belt. As a result, the ends of the cap ply are spaced closer to the belt than a central portion of the cap ply.

The center region of the tread 110 also includes central reinforcement layers 180. The central reinforcement layers 180 may be constructed of nylon or another polymeric material. While the illustrated embodiment shows a pair of central reinforcement layers, in an alternative embodiment a single central reinforcement layer may be employed. In other alternative embodiments, three or more central reinforcement layers may be employed.

The central reinforcement layers 180 create a stiffer center region of the tread 110. The number of reinforcement layers and the material properties may be varied to tune the footprint of the tire. In other words, a tire designer may make the center region of the tread stiffer or less stiff according to the tire type and its expected load and driving conditions in order to optimize performance.

Figure 5:
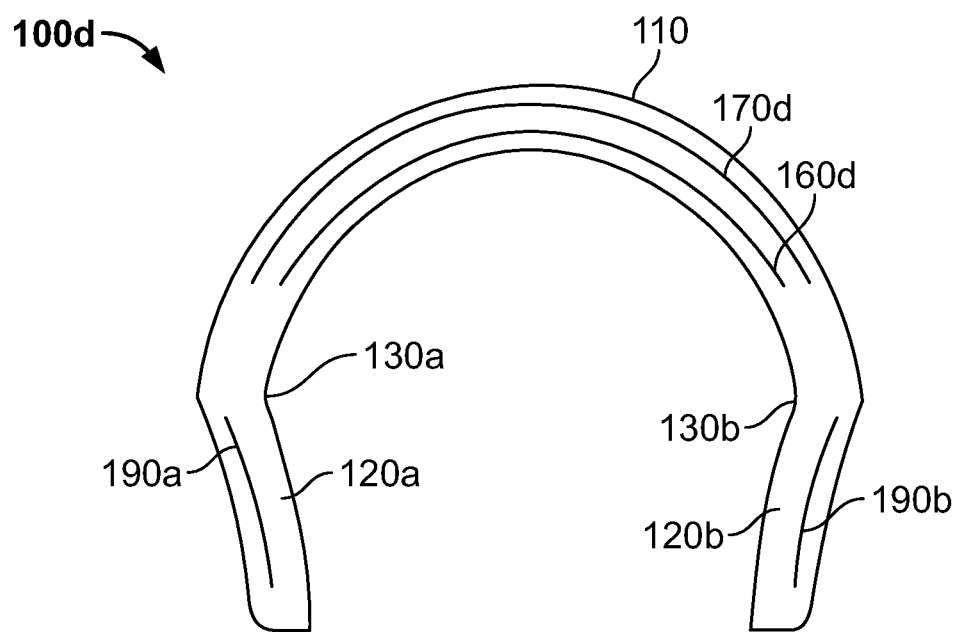

FIG. 5 is a schematic drawing illustrating a cross-section of another alternative embodiment of a tire 100d. In this embodiment, the tire 100d is substantially similar to the tires 100a, 100b, and 100c described above in reference to FIGS. 2-4, except for the differences discussed herein. Like numbers are used for like elements. The same materials may be used as those described in FIG. 2. Additionally, the alternative embodiments discussed with respect to FIGS. 2 and 4 may also be applicable.

The tire 100d includes a belt 160d and a cap ply 170d. In the illustrated embodiment, the belt 160d and cap ply 170d have substantially the same curves, such that the spacing between the belt 160d and cap ply 170d is the same across the crown region. In an alternative embodiment (not shown), the cap ply is more convex than the belt. As a result, the ends of the cap ply are spaced closer to the belt than a central portion of the cap ply.

A pair of sidewall reinforcements 190a,b are located in the sidewalls 120a,b to increase the sidewall stiffness. Stiffer sidewalls may be desired for tires that require greater load carrying capacity.

In an alternative embodiment (not shown), the tire may also include central reinforcement layers, such as the central reinforcement layers 180 of tire 100c shown in FIG. 4 and discussed above.

Figure 6:
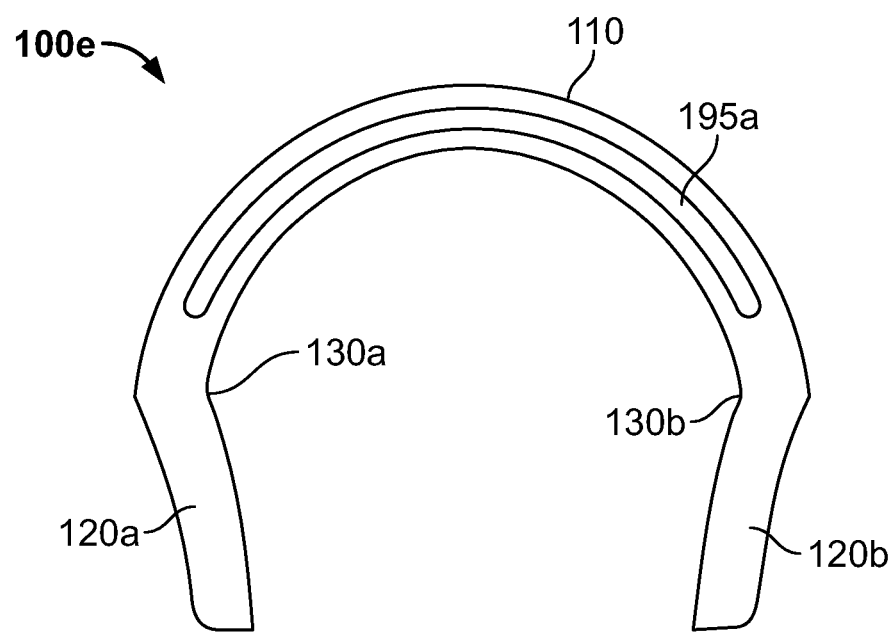

FIG. 6 is a schematic drawing illustrating a cross-section of another alternative embodiment of a tire 100e. In this embodiment, the tire 100e is substantially similar to the tires 100a, 100b, 100c, and 100d described above in reference to FIGS. 2-5, except for the differences discussed herein. Like numbers are used for like elements. The same materials may be used as those described in FIG. 2. Additionally, the alternative embodiments discussed with respect to FIG. 2, and 4-6 may also be applicable.

The tire 100e includes a shear element 195a that extends across the crown region of the tire. The shear element 195a is a high annular strength band that acts as a structural compression member on the tire, and increases interlaminar shear strength across the axial length of the tire. The shear element 195a includes a substantially inelastic membrane that surrounds an elastic center portion. The shear element 195a may be constructed with tire body plies wrapped about an extensible polymeric material. Other examples of shear elements are discussed in U.S. Pat. No. 5,879,484, which is incorporated by reference herein in its entirety. The shear element may also be referred to as a "shear band" or "band."

In the illustrated embodiment, the shear element spans the entire crown region of the tire 100e. In an alternative embodiment (not shown), the shear element spans only a portion of the crown region of the tire.

In one embodiment, the tire 100e is a non-pneumatic tire. In an alternative embodiment, the tire is a pneumatic tire and may include any of the elements discussed above with reference to FIGS. 2-5

Figure 7:
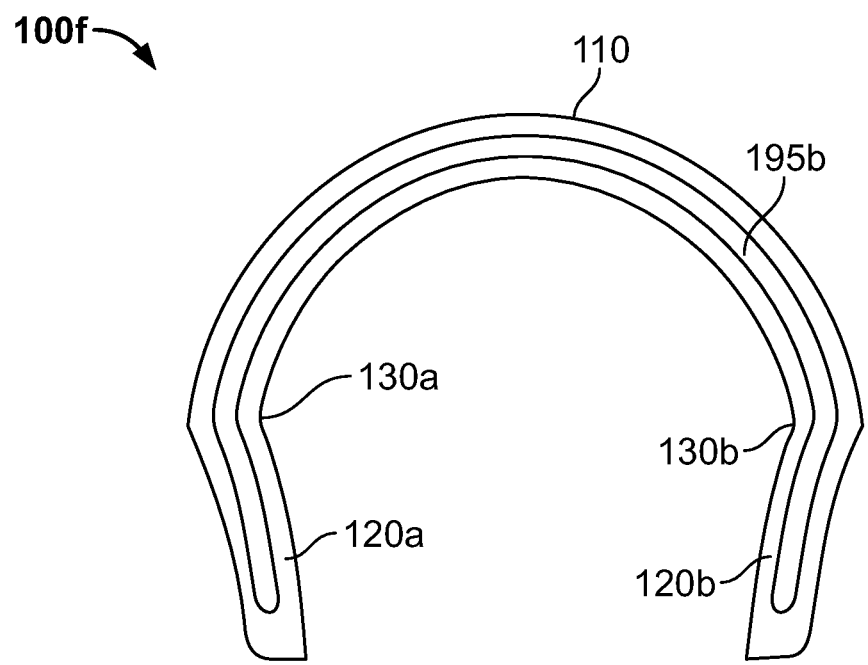

FIG. 7 is a schematic drawing illustrating a cross-section of another embodiment of a tire 100f having a shear element 195b. In this embodiment, the shear element 195b extends through the sidewalls 120a,b in addition to the tread 110. The tire is otherwise substantially the same as the tire 100e discussed above with reference to FIG. 6, and may include the alternative embodiments discussed therein. In another alternative embodiment (not shown), the shear element only extends through a portion of the sidewalls. In still another alternative embodiment (not shown), the shear element only extends into a single sidewall.

Figure 8:
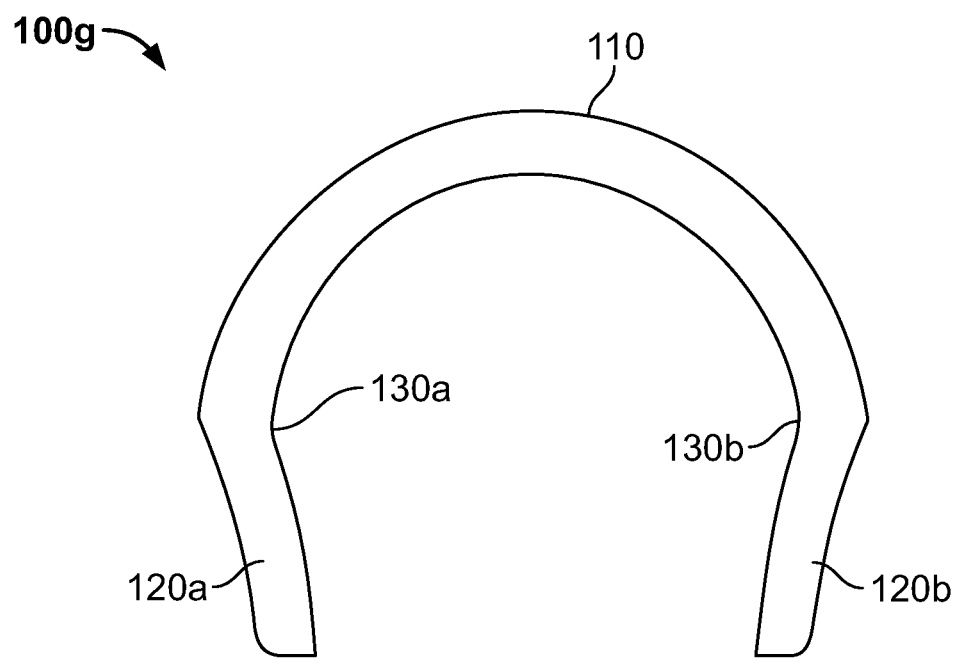

FIG. 8 is a schematic drawing illustrating a cross-section of another alternative embodiment of a tire 100g. In this embodiment, the tire 100g is substantially the same as the tires discussed above, but does not include any reinforcement elements or shear elements. In one embodiment, the tire 100g is a non-pneumatic tire. The tire 100g may be constructed of a single material, such as polyurethane, polyester, thermoplastic, or other polymeric material. Alternatively, the tire 100g may be constructed of metal or a resin. In an alternative embodiment, different components may be constructed of different material.

In one embodiment, the tire 100g is a single, unitary component. Such a tire may be manufactured through a molding, casting, or additive manufacturing process. In an alternative embodiment, components of the tire may be formed separately and then assembled. The components may be attached to each other with adhesive, or through a welding, brazing, or curing process.

In the illustrated embodiment, the sidewalls 120a,b of tire 100g are solid sidewalls. In alternative embodiments (not shown), the sidewalls include openings. The openings may define spokes or a webbing of the sidewall.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A tire comprising:
   a convex circumferential tread having a convex cross-section, wherein the convex cross-section is defined by a radius that is less than a maximum radius of the tire;
   a first concave sidewall extending from the convex circumferential tread at a first hinge,
      wherein the first concave sidewall includes a first concave exterior surface and a first concave interior surface, the first concave exterior surface and the first concave interior surface being concave from an exterior perspective of the tire, and
      wherein the first concave exterior surface is defined by a single radius that is greater than a maximum radius of the convex cross-section of the circumferential tread; and
   a second concave sidewall extending from the convex circumferential tread at a second hinge opposite the first hinge,
      wherein the second concave sidewall includes a second concave exterior surface and a second concave interior surface, the second concave exterior surface and the second concave interior surface being concave from the exterior perspective of the tire,
      wherein the second concave exterior surface is defined by a single radius that is greater than the maximum radius of the convex cross-section of the circumferential tread,
      wherein a line tangent to an interior surface of the convex circumferential tread at the first hinge, and a line tangent to an interior surface of the first concave sidewall at the first hinge form a first interior angle greater than 90-degrees when the tire is not placed under radial compression, and
      wherein a line tangent to the interior surface of the convex circumferential tread at the second hinge, and a line tangent to an interior surface of the second concave sidewall at the second hinge form a second interior angle greater than 90-degrees when the tire is not placed under radial compression.

2. The tire of claim 1, wherein the convex circumferential tread includes a shear element, having a central region located between a membrane, wherein the central region is more elastic than the membrane.

3. The tire of claim 2, wherein the shear element extends into at least a portion of the first concave sidewall.

4. The tire of claim 3, wherein the shear element extends into at least a portion of the second concave sidewall.

5. The tire of claim 1, wherein a center region of the convex circumferential tread is stiffer than outer regions of the convex circumferential tread.

6. The tire of claim 1, wherein the first interior angle is equal to the second interior angle.

7. A tire having a central axis and a radius, the tire comprising:
   a circumferential tread having a convex cross-section, wherein the convex cross-section is defined by a radius that is less than a maximum radius of the tire;
   a pair of sidewalls extending from opposite sides of the circumferential tread, wherein each of the pair of sidewalls has a concave cross-section, including a concave exterior surface and a concave interior surface that are each concave from an exterior perspective of the tire, the concave exterior surface being defined by a single radius that is greater than a maximum radius of the convex cross-section of the circumferential tread.

8. The tire of claim 7, wherein the convex cross-section of the circumferential tread is an arc defined by a single radius.

9. The tire of claim 7, wherein the convex cross-section of the circumferential tread is a curve defined by multiple radii.

10. The tire of claim 7, wherein the pair of sidewalls includes a first sidewall extending from a first hinge and a second sidewall extending from a second hinge.

11. The tire of claim 10, wherein a line tangent to an interior surface of the circumferential tread at the first hinge and a line tangent to an interior surface of the first sidewall at the first hinge form a first interior angle that is obtuse when the tire is not placed under radial compression, and wherein a line tangent to the interior surface of the circumferential tread at the second hinge and a line tangent to an interior surface of the second sidewall at the second hinge form a second interior angle that is obtuse when the tire is not placed under radial compression.

12. A tire and rim assembly comprising:
   a rim having a pair of wheel flanges, including a first wheel flange and a second wheel flange;
   a tire mounted on the rim, the tire including:
      a tread formed in a crown region of the tire, the tread having a convex cross-section;
      a first sidewall extending from a first side of the crown region, wherein the first sidewall has a concave cross-section including a first concave exterior surface, wherein the first concave exterior surface is defined by a single radius that is greater than a maximum radius of the convex cross-section of the tread, wherein the first sidewall of the tire is received by the first wheel flange of the rim, and wherein the first sidewall exerts a first axially outward force against the first wheel flange of the rim;
      a second sidewall extending from the crown region opposite the first sidewall, wherein the second sidewall has a concave cross-section including a second concave exterior surface, wherein the second concave exterior surface is defined by a single radius that is greater than the maximum radius of the convex cross-section of the tread, wherein the second sidewall is received by the second wheel flange of the rim, and wherein the second sidewall exerts a second axially outward force against the second wheel flange of the rim.

13. The tire and rim assembly of claim 12, wherein the tire is a pneumatic tire.

14. The tire and rim assembly of claim 13, further comprising a circumferential belt.

15. The tire and rim assembly of claim 13, further comprising a pair of lower sidewall reinforcements.

16. The tire and rim assembly of claim 12, wherein the tire is a non-pneumatic tire.

17. The tire and rim assembly of claim 12, wherein the first axially outward force is between 100 and 500 pounds, and wherein the second axially outward force is between 100 and 500 pounds.

18. The tire of claim 7, wherein the circumferential tread includes a shear element, having a central region located between a membrane, wherein the central region is more elastic than the membrane.

19. The tire and rim assembly of claim 12, wherein the first sidewall has a first concave interior surface, the first concave exterior surface and the first concave interior surface each being concave from an exterior perspective of the tire, and wherein the second sidewall has a second concave interior surface, the second concave exterior surface and the second concave interior surface each being concave from the exterior perspective of the tire.

\* \* \* \* \*